United States Patent [19]

Powell

[11] Patent Number: 4,957,001

[45] Date of Patent: Sep. 18, 1990

[54] APPARATUS AND METHOD FOR MEASURING RESERVOIR PRESSURE CHANGES

[75] Inventor: John M. Powell, Yorba Linda, Calif.

[73] Assignee: Chevron Research Company, San Francisco, Calif.

[21] Appl. No.: 374,192

[22] Filed: Jun. 29, 1989

[51] Int. Cl.$^5$ .............................................. G01L 13/02
[52] U.S. Cl. ......................................... 73/716; 73/706
[58] Field of Search ..................... 73/151, 40, 49.2 T, 73/301, 700, 706, 708, 384, 715, 716, 729, 714

[56] References Cited

U.S. PATENT DOCUMENTS 3,538,746 11/1970 Jacobs et al. .................... 73/49.2 T
3,898,877 8/1975 McArthur ............................. 73/151

*Primary Examiner*—Donald O. Woodiel
*Attorney, Agent, or Firm*—Edward J. Keeling; Ernest A. Schaal

[57] ABSTRACT

An apparatus for the accurate measurement of pressure changes has a reference accumulator and a differential pressure transducer. The reference accumulator stores a pressure representative of the environment being measured. The differential pressure transducer measures the difference between the reference pressure and the pressure of the environment being measured. Connected to the reference accumulator is a valve that allows the reference accumulator to be charged to a pressure representative of the environment being measured and provides protection to the differential pressure transducer from overpressuring. This valve can be controlled remotely by electrical means. With the use of an isolation means, such as an isolation bellows, the whole apparatus can be protected from the environment being measured. A data acquisition and control system connected both to the differential pressure transducer and to the valve can be used to record measurements from the differential pressure transducer and to control the valve.

6 Claims, 1 Drawing Sheet

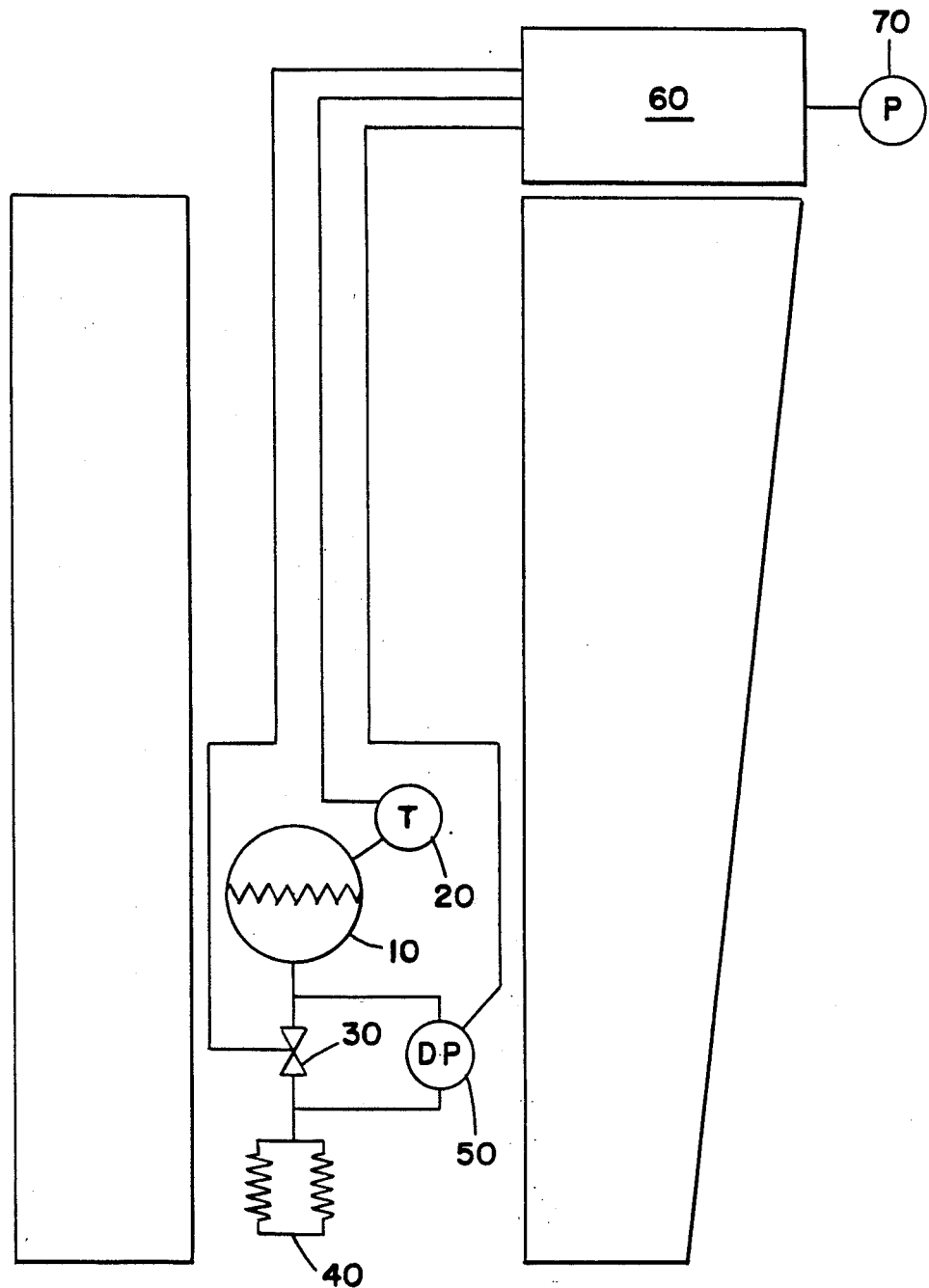
FIG_1

APPARATUS AND METHOD FOR MEASURING RESERVOIR PRESSURE CHANGES

The present invention relates to the accurate measurement of small changes in pressure.

BACKGROUND OF THE INVENTION

This invention has been designed to measure pressure changes occurring in reservoirs due to the actions of tidal forces, such as earth-tides. These pressure changes are on the order of a fraction of a psi occurring in the presence of several thousand psi of absolute pressure. The use of these small pressure changes is disclosed in the U.S. patent application Ser. No. 374,193, filed June 29, 1989 entitled "Analyzing a Hydrocarbon Reservoir by Determining the Response of that Reservoir to Tidal Forces," which was filed concurrently with this application and which is hereby incorporated by reference for all purposes.

Currently, reservoir pressure measurements are made through the use of various types of absolute pressure transducers installed, either temporarily or permanently, in a well communicating with the reservoir. These types of transducers do not have adequate precision to accurately measure earth-tide induced pressure changes.

SUMMARY OF THE INVENTION

The present invention involves an apparatus and a method for the accurate measurement of small pressure changes. The apparatus comprises a reference accumulator and differential pressure transducer. The reference accumulator stores a reference pressure that is representative of the environment being measured. The differential pressure transducer, which is connected to the reference accumulator, measures the difference between the reference pressure and the pressure of the environment being measured. The measurement that is made is the time variation of the reservoir pressure with respect to an arbitrary reference (the pressure that is representative of the environment being measured).

Connected to the reference accumulator is a valve that allows the reference accumulator to be charged to the pressure representative of the environment being measured. The valve also protects the differential pressure transducer from overpressuring. Preferably, the valve is controlled remotely. More preferably, it is controlled remotely by electrical means.

The apparatus is protected from the environment being measured by the use of an isolation means, such as an isolation bellows.

A data acquisition and control system is connected to the differential pressure transducer to record measurements from that transducer. The data acquisition and control system is also connected to the valve to control the valve. A barometer is connected to that data acquisition and control system. A temperature transducer is physically located on the reference accumulator such that the temperature transducer can be used to measure the temperature of the gas in the accumulator. That temperature transducer is electrically connected to the data acquisition and control system.

Accurate measurements of pressure changes are achieved by storing a pressure representative of the environment being measured, and measuring the difference between that stored pressure and the pressure of the environment being measured. Preferably, the stored pressure (the pressure representative of the environment being measured) is adjusted to remove changes caused by temperature.

BRIEF DESCRIPTION OF THE DRAWINGS

In order to facilitate the understanding of this invention, reference will now be made to the appended drawings of preferred embodiments of the present invention. The drawings are exemplary only, and should not be construed as limiting the invention.

FIG. 1 is a schematic drawing of one embodiment of the present invention as used within a borehole.

DETAILED DESCRIPTION OF THE PREFERRED EMBODIMENTS

In its broadest aspect, the present invention is an apparatus and method for the accurate measurement of pressure changes.

The apparatus has a reference accumulator and a differential pressure transducer. The reference accumulator stores a reference pressure representative of the environment being measured. The differential pressure transducer, which is connected to the reference accumulator, measures the difference between the reference pressure and the pressure of the environment being measured.

By "reference accumulator," we mean a pressure vessel that has a compressible medium in it that can store hydraulic energy. That compressible medium is usually a gas. The reference accumulator has a diaphragm or membrane which separates the working fluid in the environment (which is an incompressible liquid) from the compressible medium in the accumulator. The reference accumulator is used to provide a reference pressure.

By "pressure representative of the environment being measured," we mean a pressure in the environment that is measured at one point in time and is used as a set point over a longer period of time. That pressure is an arbitrary pressure insofar as it is taken at an arbitrary point in time. The purpose of the "pressure representative of the environment being measured" is to serve as a reference (or set point) from which pressure changes can be measured.

By "differential pressure transducer," we mean a device that measures the difference in pressure between two pressures. In one embodiment, the differential pressure transducer produces a voltage that is proportional to the difference in the two pressures.

Connected to the reference accumulator is a valve that allows the reference accumulator to be charged to the reference pressure. This valve is left open while the device is lowered into the borehole, then is closed when downhole. The valve provides protection to the differential pressure transducer from overpressuring that would otherwise result from the increasing hydraulic pressure as the device is lowered into the borehole. By "overpressuring," we mean a situation where the measured difference in two pressures exceeds the operating limits of the differential pressure transducer. Preferably, the valve is controlled remotely so that the controlling electronics are not exposes to the rough environment downhole. More preferably, the valve is controlled remotely by electrical means.

Connected to the valve is an isolation means for protecting the apparatus from the environment being measured. By "isolation means," we mean a means that will prevent the environment from damaging the equipment but will not hamper the normal functioning of that equipment. Preferably, that isolation means is an isolation bellows.

Connected both to the valve and to the differential pressure transducer is a data acquisition and control system. That data acquisition and control system records measurements from the differential pressure transducer and controls the valve.

Preferably, a barometer is connected to the data acquisition and control system. That barometer can be an electronic barometer.

Preferably, a temperature transducer is connected electrically to the data acquisition and control system and physically to the reference accumulator. That temperature transducer is used to measure the temperature of the compressible medium in the reference accumulator to correct for temperature-induced changes in pressure.

Accurate measurements of pressure changes can be made by storing a pressure representative of the environment being measured, and measuring the difference between that stored pressure and the pressure of the environment being measured. In that method, the stored pressure is adjusted to remove changes caused by temperature.

Referring to FIG. 1, this invention can consist of two parts. The first part is contained in a sonde which is lowered into a well that communicates with the reservoir.

The sonde contains a gas/fluid reference accumulator 10, a temperature transducer 20, an electrically controlled valve 30, an isolation bellows 40, and a differential pressure transducer 50. The second part consists of a data acquisition and control system 60 and a barometer 70. This second part stays on the surface.

During installation, the data acquisition and control system 60 causes the electrically controlled valve 30 to remain open. This allows the reservoir pressure to be transmitted to the reference accumulator 10 through the isolation bellows 40. It also protects the differential pressure transducer 50 from overpressuring by assuring that both transducer ports are connected to essentially the same pressure. Once installation is complete and the depth of the instrument is held constant, the data acquisition and control system 60 closes the electrically controlled valve 30. The reference accumulator 10 now holds a reference pressure which is the absolute pressure of the reservoir at the time the electrically controlled valve 30 was closed. The data acquisition and control system 60 now reads the output of the differential pressure transducer 50 to record variations in the reservoir pressure. The barometer 70 is also read to allow correction for the effects of atmospheric pressure variations on the reservoir pressure. As the reservoir pressure varies it will eventually increase or decrease beyond the range of the differential pressure transducer 50. When this occurs the data acquisition and control system 60 will open the electrically controlled valve 30 and allow the pressure in the reference accumulator 10 to match the then current reservoir pressure. The electrically controlled valve 30 is then closed and data acquisition is continued.

In another embodiment, the reference accumulator is pre-charged prior to being lowered into the borehole.

While the present invention has been described with reference to specific embodiments, this application is intended to cover those various changes and substitutions which may be made by those skilled in the art without departing from the spirit and scope of the appended claims.

What is claimed is:

1. An apparatus for the accurate measurement of pressure changes comprising:
   (a) a reference accumulator that stores a reference pressure representative of the environment being measured,
   (b) a differential pressure transducer connected to said reference accumulator, wherein said differential pressure transducer measures the difference between the reference pressure and the pressure of the environment being measured,
   (c) a valve connected to said reference accumulator that allows the reference accumulator to be charged to a pressure representative of the environment being measured and provides protection to said differential pressure transducer from overpressuring, and
   (d) an isolation bellows, connected to said valve, for protecting said apparatus from the environment being measured.

2. The apparatus according to claim 1 wherein said valve is controlled remotely.

3. The apparatus according to claim 2 wherein said valve is controlled remotely by electrical means.

4. The apparatus according to claim 1 further comprising a data acquisition and control system connected to said differential pressure transducer and to said valve to record measurements from said differential pressure transducer and to control said valve.

5. The apparatus according to claim 4 further comprising a barometer connected to said data acquisition and control system.

6. The apparatus according to claim 4 further comprising a temperature transducer electrically connected to said data acquisition and control system and physically connected to the reference accumulator.

* * * * *